United States Patent
Rakoff et al.

[11] Patent Number: 5,539,480
[45] Date of Patent: Jul. 23, 1996

[54] SUNGLASSES INCORPORATING A FLUID SUNSCREEN DISPENSER

[76] Inventors: David Rakoff; Andrea Frankel, both of 190 Lowther Avenue, Unit G, Toronto, Ontario, Canada, M5R 1E8

[21] Appl. No.: 355,924

[22] Filed: Dec. 14, 1994

[51] Int. Cl.$^6$ ........................................ G02C 1/00
[52] U.S. Cl. ..................... 351/158; 351/41; 351/44; 351/121
[58] Field of Search .................. 351/158, 44, 41, 351/45, 46, 47, 57, 51, 52, 130, 111, 121; 2/426, 431, 432

[56] References Cited

U.S. PATENT DOCUMENTS 4,687,306  8/1987  Lipson et al. ........................ 351/51
4,828,355  5/1989  Lipson et al. ........................ 351/51
4,938,580  7/1990  Stang ................................. 351/47

FOREIGN PATENT DOCUMENTS 617318  2/1961  Italy .

Primary Examiner—William L. Sikes
Assistant Examiner—Hung Xuan Dang
Attorney, Agent, or Firm—Bereskin & Parr

[57] ABSTRACT

An eyeglass frame, preferably for sunglasses, includes an elongate chamber for containing a fluid sunscreen. At one end the chamber includes a dispensing port and a closure plug. A mechanism is provided for dispensing a fluid sunscreen from the dispensing port, which mechanism can be a displaceable piston or a provision of a flexible container that can be squeezed by a user. This enables a user to have access to a supply of sunscreen, without having to carry a separate bottle or container of sunscreen.

11 Claims, 3 Drawing Sheets

SUNGLASSES INCORPORATING A FLUID SUNSCREEN DISPENSER

FIELD OF THE INVENTION

This invention relates to sunglasses and to the dispensing of cream or lotion for sun tanning.

BACKGROUND OF THE INVENTION

There is increasing awareness of the damage done to human skin by unprotected exposure to the sun. Recently, concerns about exposure to ultra violet radiation in particular have heightened, due to concerns about damage to the ozone layer.

Exposure to the sun naturally occurs in many outdoor sports, such as golf, tennis, fishing, bicycling, etc. Additionally, many people enjoy simply relaxing outdoors in the sun.

In view of the awareness of the potential damage caused by solar radiation, many people commonly provide themselves with suitable protection, typically relying on a combination of suitable clothing, sunglasses, and a fluid sunscreen. The fluid sunscreen is usually applied as a lotion or cream to exposed areas of the skin. For many outdoor activities, long clothing covering much of the skin can be used. However, this is uncomfortable and unsuitable in hot climates, and is impractical for certain sports, such as tennis. In any event, many people enjoy sunbathing and getting a tan.

Where someone is deliberating setting out to sunbathe or engage in an activity which will result in significant exposure to solar radiation, the person usually has no difficulty in making suitable preparations; that is to say, they will routinely take with them sunglasses and some form of fluid sunscreen. However, there are many instances where a person may not be so well prepared.

While many people routinely carry sunglasses with them, they will often not remember to carry suntan lotion. Consequently, they can find themselves exposed to the sun, and only have their sunglasses available for protection.

Even if they are wearing long-sleeved clothing, there are parts of the body, which are extremely sensitive, and can become rapidly sunburned. For example, the back of one's neck, and ears and nose can become sunburned quite quickly. Accordingly, it is desirable to provide some means by which a user of a pair of sunglasses can have available to them at all times, at least a modest supply of suntan lotion or cream, in case they should need it.

Sunglasses have traditionally just been designed and configured for use as sunglasses. They are provided either as a separate pair of glasses; or as a simple frame intended to clip on to the frame of an existing pair of eye glasses, with the sunglasses then having no separate side frames or temple pieces. More recently, the sunglasses have been provided which include temple pieces and are intended to fit over existing eye glasses.

Certain novelty frames have been suggested, for example, as in Italian patent 617,318 or in U.S. Pat. Nos. 4,828,355 and 4,687,306, both to Lipson et al. The Italian patent is concerned with providing a mechanism for dispensing perfume. The U.S. patents are solely concerned with providing a novel visual effect, by providing a transparent frame, with coloured liquid inside it.

SUMMARY OF THE PRESENT INVENTION

In accordance with the present invention, there is provided an eyeglass frame including: a chamber for holding a fluid sunscreen; a dispensing port for dispensing the a fluid sunscreen; dispensing means for displacing the a fluid sunscreen from the chamber. The term fluid sunscreen has the meaning defined below and dispensing the sunscreen as required and for otherwise retaining the sunscreen in the chamber.

In one embodiment, the chamber is elongate and of uniform cross-section and the dispensing means comprises a piston axially displaceable along the chamber and including an internally threaded bore, an internally threaded shaft engaging the internally threaded bore of the piston, and an actuation knob secured to the shaft for rotation thereof to displace the piston.

In another embodiment, the means for dispensing comprises an elongate flexible container with the dispensing port being provided at one end thereof, and which is mounted to enable the flexible container to be squeezed by a user's fingers to dispense fluid sunscreen from the dispensing port.

Either embodiment may be integral with the frame, or it may be formed as a separate disposable container. Either embodiment can be included in the main or front frame of an eyeglass frame, or in one or both side frames.

Preferably, the eyeglass frame includes lenses which significantly reduce the amount of light transmitted therethrough, to protect the user's eyes from excessive radiation.

In the specification, including the claims, reference to reduction of light transmission through the lenses, is a reference to significant reduction and light transmission, and refers to a reduction in transmission which is significantly greater than that which inherently incurs in light transmission through any lens.

In the specification, including the claims, reference to fluid "sunscreen" is a reference to any suitable liquid, cream or paste, which is intended for application to human skin, which includes a component adapted to absorb some component of solar radiation, or otherwise reduce the amount of solar radiation absorbed by a user's skin and which is sufficiently fluid that it can be passed through a dispensing port to a user.

BRIEF DESCRIPTION OF THE DRAWING FIGURES

For a better understanding of the present invention, and to show more clearly how the same may be carried into effect, reference will now be made, by way of example, to the accompanying drawings, which show a preferred embodiment of the present invention, and in which.

DESCRIPTION OF PREFERRED EMBODIMENT

Figure 1:
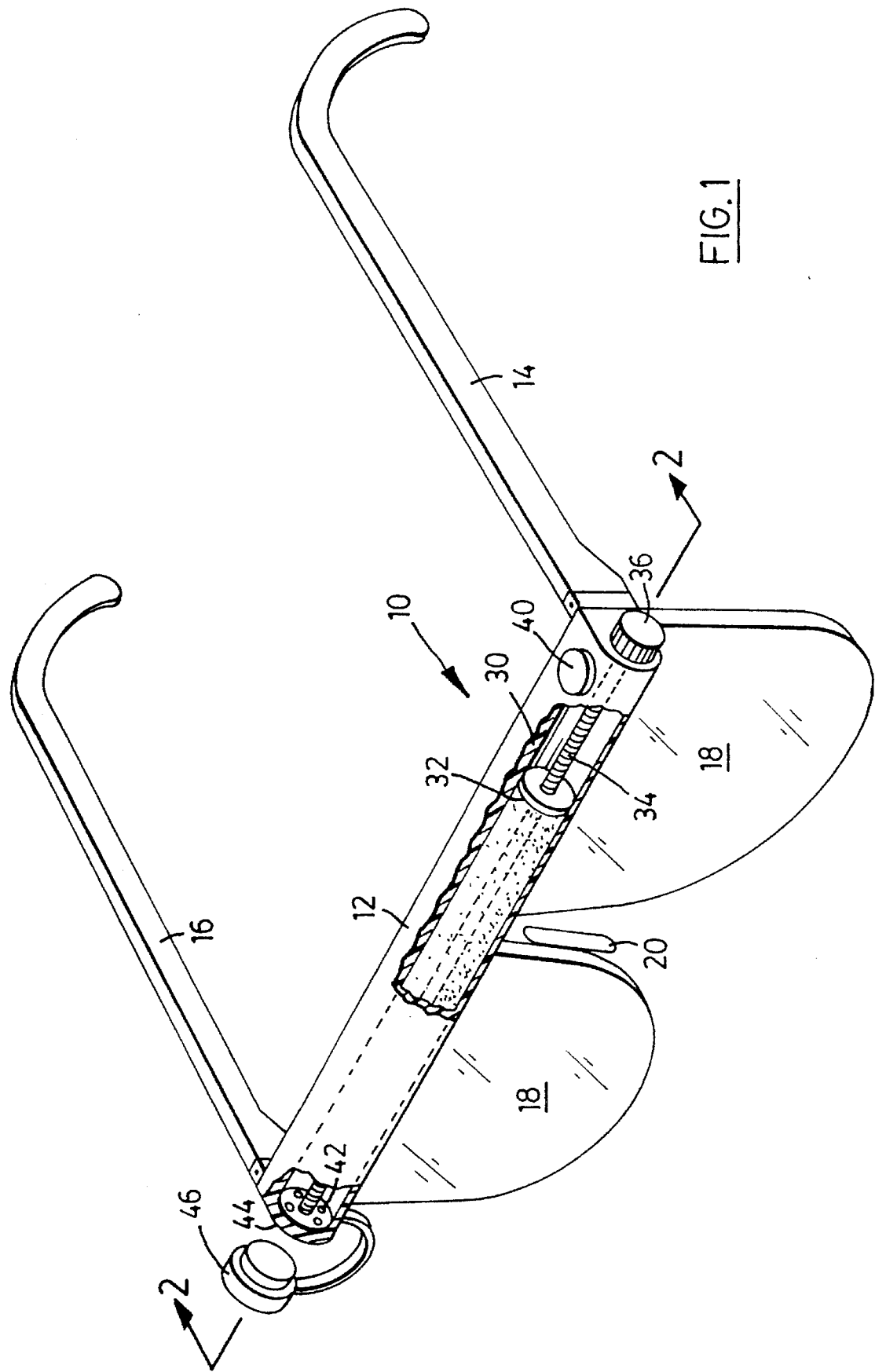
FIG. 1 is a perspective view of an eyeglass frame in accordance with a first embodiment of the present invention.

Referring first to FIG. 1, an eyeglass frame is indicated generally by the reference 10. The frame 10 comprises a main frame 12, with a pair of side frames or temple pieces 14, 16 pivotally attached thereto, in known manner. The main frame 12 holds a pair of lenses 18, and can include nose supports 20 for supporting the glasses on a user's nose.

It is to be appreciated that the basic mechanical configuration of the frame 12 is not critical to the present invention, and any suitable frame design can be used. For example, the side frames 14, 16 can be configured to join the main frame 12 at the middle of the sides of the main frame, rather than at the top. The main frame 12 can hold the lenses 18 in any suitable manner. For example, it could include narrow frame elements encircling the lenses as is known; alternatively, the lenses 18 could simply be held at selected points around their edges. Alternatively, the side frames 14, 16 could be omitted and clips could be provided in known manner for clipping the frame 12 to a pair of conventional glasses.

Now, in accordance with the present invention, at least one component of the frame 10 is provided with a mechanism for dispensing fluid sunscreen, this being provided in the main frame 12 in FIG. 1.

The top of the main frame 12 is enlarged, to define an elongate chamber 30 of uniform cross-section. Within the chamber 30, there is a piston or displacement member 32 which includes an internally threaded bore engaging a threaded shaft 34. The right hand end of the threaded shaft is secured or connected to a knob 36, while the left end of the shaft 34 is mounted for rotation. A filling port 38 is provided adjacent to the knob 36, and can be closed by a cap 40.

At the left hand end, around the shaft 34, a number of small openings 42 are provided, which collectively form a dispensing port 44. A closure plug 46 is provided for closing the dispensing port 44.

It is preferred for the threaded shaft 34 to a have a left hand thread, so that clockwise rotation of the knob 36 will displace the piston 32 towards the left hand end; counter clockwise movement will withdraw the piston 32 towards the knob 36. The piston 32 includes means preventing its rotation within the chamber 30. This can be achieved simply by making the chamber 30 and piston 32 with similar non-circular profiles. Here, the chamber 30 can be configured so as to be slim and unobtrusive, so as not to make the frame too bulky. This then ensures that the rotation of the shaft 34 causes displacement of the piston 32 axially, without the piston rotating.

Figure 2:
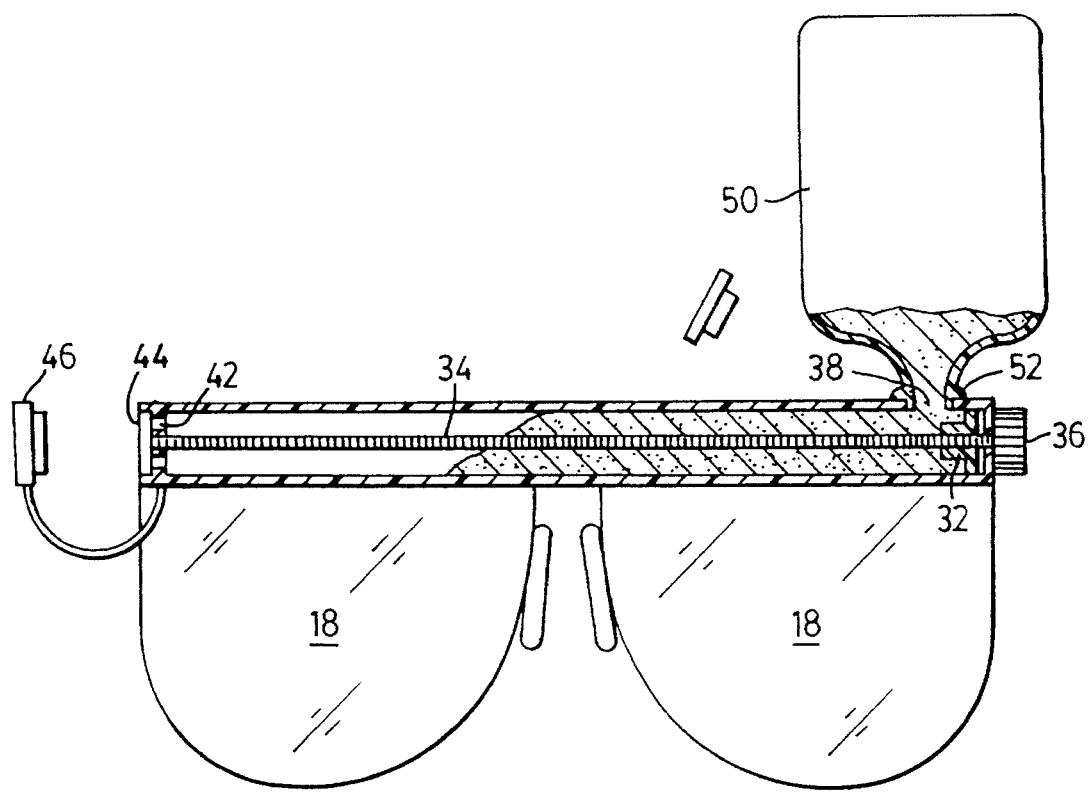
FIG. 2 is a sectional view along line 2—2 of FIG. 1, showing filling of the chamber of the frame.

In use, the first action for a user is to fill the chamber 30 with fluid sunscreen. This is shown in FIG. 2. First, the piston 32 is withdrawn to the extreme right hand position by counterclockwise rotation of the knob 36, so that the piston 32 is to the right of the filling port 38.

The cap 40 is removed. A filling bottle 50, according to the present invention, is provided, having a neck formation 52 which is complementary to the filling port 38. The bottle 50 is made of flexible, resilient material, so that it can be squeezed to dispense sunscreen. The bottle 50 is engaged to the port 38 and squeezed to force sunscreen into the chamber 30, as shown in FIG. 2. Preferably, the chamber 30 is filled until sunscreen reaches the dispensing port 44.

Any suitable fluid sunscreen lotion can be used, which can be provided as a liquid, cream or paste. As noted above in this specification including the claims, the term "fluid sunscreen" denotes a sunscreen which is a liquid, cream or paste, and which is sufficiently fluid that it can be passed through a dispensing port to a user. It is anticipated that a sunscreen provided as a liquid or oil may not be suitable, and may tend to leak. Rather, it is anticipated that a fluid sunscreen having a significant viscosity will be preferable. During filling, as shown in FIG. 2, the closure part 46 is removed, to enable air to be vented from the chamber 30.

With the chamber 30 filled, the cap 40 and closure plug 46 are replaced. The glasses 10 can then be carried by the user and can then simultaneously provide a supply of sunscreen, without the user having to also carry the bottle 50. In use, when wearing the glasses, the user can dispense sunscreen, by simply opening the closure plug 46. The knob 36 is then rotated by one hand, while fingers of the other hand accept sunscreen dispensed from the dispensing port 44. The sunscreen can then be applied to exposed areas of the skin as desired.

It is then anticipated that the glasses of the present invention will provide an adequate supply of sunscreen for occasional use, for application to small areas of the skin, such as ears, nose, back of the neck, etc. The chamber 30 can be recharged as and when required.

Figure 3:
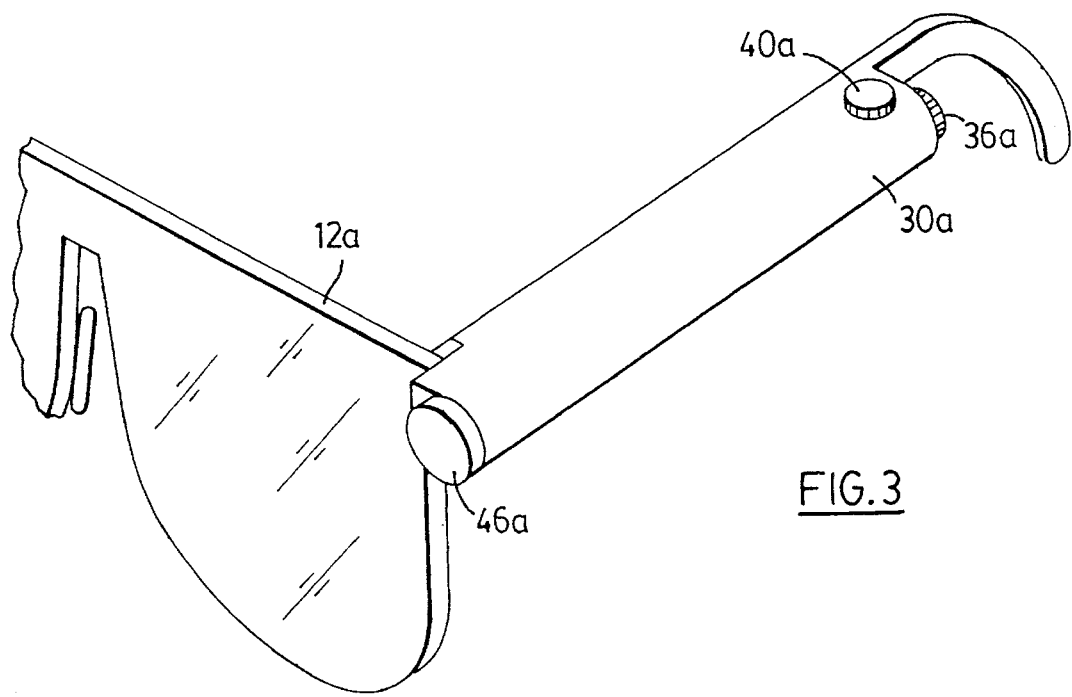
FIG. 3 is a perspective view of a second embodiment of the present invention.

The sunscreen chamber can alternatively be provided in one or both the side frames 14, 16, as shown in FIG. 3. Here, components similar to FIGS. 1 and 2 are given the same reference numeral but with the suffix "a". First, a chamber 30a includes a threaded shaft (not visible) actuated by a knob 36a. This embodiment would function in the same way as the first embodiment, and includes a closure cap 46a and a cap 40a.

Figure 4:
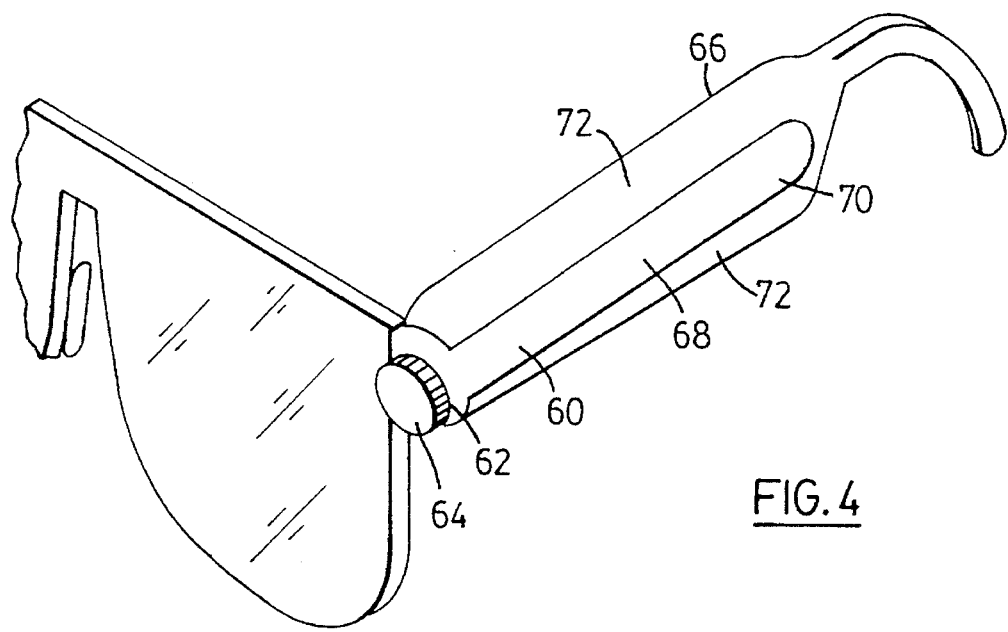
FIG. 4 is a perspective view of a third embodiment of the present invention.

A third embodiment is shown in FIG. 4, where, as an alternative to a rigid chamber, a flexible container 60 is provided. As before, the container 60 includes a dispensing port 62 and corresponding closure cap 64. In view of the nature of a flexible container, the port 62 also doubles as a filling port. The container 60 extends through an elongate slot indicated at 70, defined by two outer wall portions 72 of the side frame 66, to provide an exposed portion 68 that can be squeezed by a user. It could alternatively be secured to the outside of the frame.

The container 60 would be filled in use, in like manner as for the chamber 30 of the earlier embodiment. To dispense the sunscreen, the cap 64 is removed. The user then squeezes the exposed portion 68 of the container 60 at a suitable point and slides his or her fingers towards the dispensing port 62, thereby dispensing the desired amount of sunscreen from the port 62. With the sunscreen dispensed, the container 60 is released and the closure cap 64 replaced.

Figure 5:
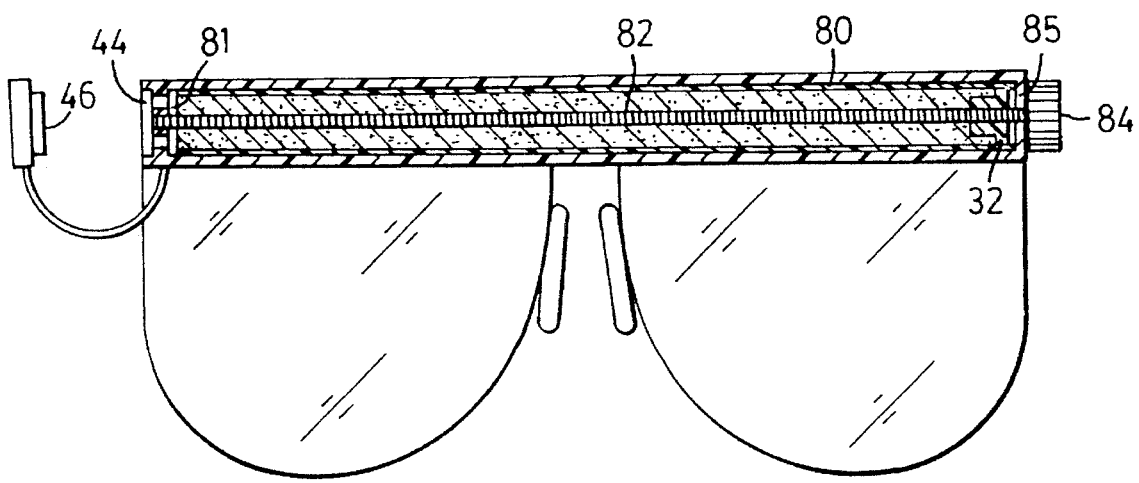
FIG. 5 is a perspective view of a fourth embodiment of the present invention.

The embodiments described above have the chamber 30 or container 60 as integral parts of the frame 10. For ease of use, and to avoid the complexity of having to fill the chamber or container an alternative embodiment of the present invention provides the sunscreen in sealed, disposable containers. This is shown in FIG. 5, where for simplicity components common to FIG. 1 are given the same reference numeral.

As compared to the first embodiment of FIG. 1, the filling port 38 and cap 40 are omitted. The chamber 30 is provided by an elongate thin-walled, disposable container 80, accommodated within a cavity 81 of the frame 12. This container 80 includes the piston 32 and a threaded shaft 82 and knob 84. It would also include at the other end the dispensing port 44. The frame 12 would then include an opening to receive the knob 84.

This container would then be slid into the appropriately shaped cavity 81 within the frame 12 so that the knob 84 was protruding for use, through an opening 85. The closure plug 46 could then be used to close the container in known manner.

It may be desirable to retain the knob 84 as part of the frame, for example where the knob is made out of some relatively expensive material so as to match the frame; alternatively, the plug 46 could be part of the disposable container 80. Then, the knob 84 is rotatably mounted in the frame and includes a non-circular bore, as a coupling formation, which engages the end of the threaded shaft having a complementary coupling formation.

The advantage to this arrangement is that the problems of filling the chamber, with possible spillage of sunscreen etc are avoided. Instead, once the sunscreen is exhausted the disposable container 80 is simply removed and a new container inserted. It is anticipated that packs of the disposable containers 80 could be sold ready for use.

Similarly, for the third embodiment, it is proposed that part of the frame could be provided with a slot or recess to receive a disposable flexible container. The container would be a simple flexible, thin-walled container which could be slid into this recess and would include a suitable dispensing port and cap. It would be used as described above for the integral version. When exhausted, it could be disposed of and a new container inserted.

We claim:

1. An eyeglass frame including: a chamber for holding a fluid sunscreen; a dispensing port for dispensing the fluid sunscreen; dispensing means for displacing the fluid sunscreen from the chamber and dispensing the fluid sunscreen as required and for otherwise retaining the fluid sunscreen in the chamber.

2. An eyeglass frame as claimed in claim 1, wherein the chamber is elongate and of uniform cross-section and wherein the dispensing means comprises a piston axially displaceable along the chamber and including an internally threaded bore, an internally threaded shaft engaging the internally threaded bore of the piston, and an actuation knob secured to the shaft for rotation thereof to displace the piston.

3. An eyeglass frame as claimed in claim 2, which includes a closure plug for closing the dispensing port.

4. An eyeglass frame as claimed in claim 3, which includes a filling port and a closure cap therefor, with the filling port and the actuation knob being provided adjacent one end of the chamber and the dispensing port being provided at the other end of the chamber.

5. An eyeglass frame as claimed in claim 3, wherein the chamber is provided as a disposable thin-walled container, which includes the threaded shaft and the piston.

6. An eyeglass frame as claimed in claim 4 or 5, wherein the eyeglass frame includes a mainframe and a pair of side frames, and wherein the elongate chamber is provided in the mainframe.

7. An eyeglass frame as claimed in claim 4 or 5, wherein the eyeglass frame comprises a mainframe and a pair of side frames, and wherein the elongate chamber is provided in one or both of the side frames.

8. An eyeglass frame as claimed in claim 4 or 5, which includes lenses, which provide for significant reduction in light transmission therethrough.

9. An eyeglass frame as claimed in claim 1, wherein the means for dispensing comprises an elongate flexible container with the dispensing port being provided at one end thereof, and which is mounted to enable the flexible container to be squeezed by a user's fingers to dispense sunscreen from the dispensing port.

10. An eyeglass frame as claimed in claim 9, wherein the flexible container is integral with the eyeglass frame and protrudes through an elongate slot therein, and wherein the flexible container includes a filling port and cap at an end thereof remote from the dispensing port.

11. An eyeglass frame as claimed in claim 9, wherein the flexible container is disposable and is mounted within an elongate slot of the frame.

* * * * *